United States Patent

[11] 3,593,917

| [72] | Inventor | Andre Sebastien Joseph Buisson<br>Montbeliard, France |
|---|---|---|
| [21] | Appl. No. | 801,545 |
| [22] | Filed | Feb. 24, 1969 |
| [45] | Patented | July 20, 1971 |
| [73] | Assignees | Automobiles Peugeot<br>Paris, France;<br>Regie Nationale des Usines Renault<br>Billancourt, France |
| [32] | Priority | Mar. 1, 1968 |
| [33] | | France |
| [31] | | 141962 |

[54] THERMOSTATIC TAP
8 Claims, 5 Drawing Figs.

[52] U.S. Cl. ............................................. 236/98,
236/99, 251/14
[51] Int. Cl. ........................................ G05d 23/02,
F16k 31/00
[50] Field of Search ............................................. 236/55,
100, 32, 98; 251/14, 130

[56] References Cited
UNITED STATES PATENTS

| 2,101,735 | 12/1937 | Fonseca | 236/15 |
| 2,264,677 | 12/1941 | Oxland | 251/14 |
| 2,647,538 | 8/1953 | Demay | 251/14 |
| 3,442,078 | 5/1969 | Nolan | 236/68 A |

*Primary Examiner*—William E. Wayner
*Attorney*—Burns, Doane, Swecker & Mathis

ABSTRACT: Thermostatic tap of the type comprising an automatically operating thermostatic device having a bulb and a capillary tube and a manually controlled regulating device. This tap has the feature that the end of the receiving element of the thermostatic device has a position which is fixed relative to the body of the tap and to the bulb. The manually controlled regulating device is coaxial with the receiving element and interposed between the latter and a valve seat and carries a valve which cooperates with the seat and modifies the section of the passage for the heating fluid in the tap body.

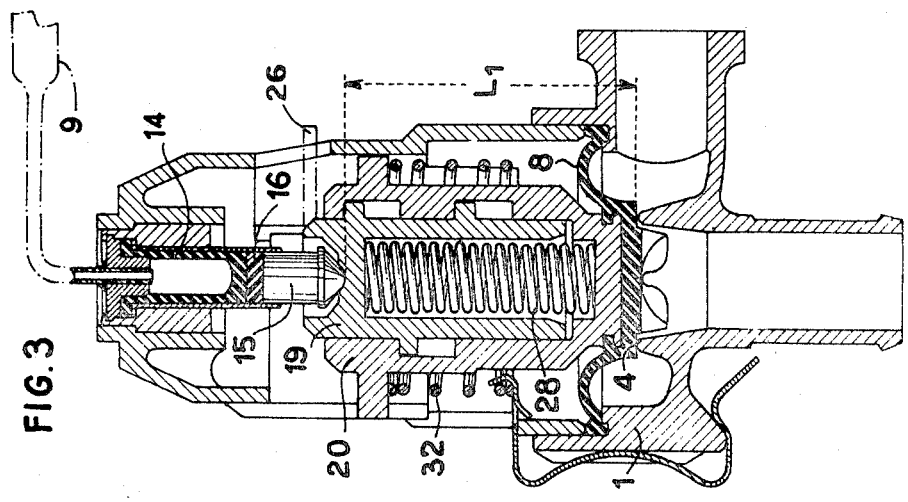
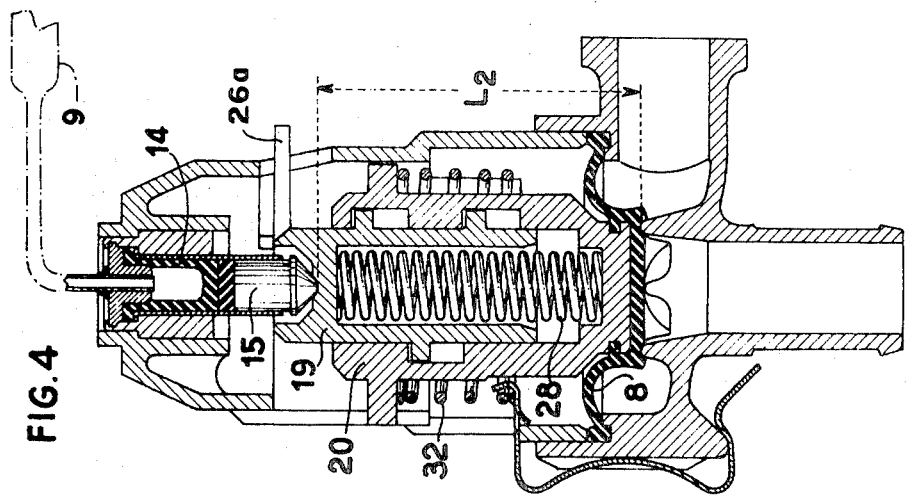
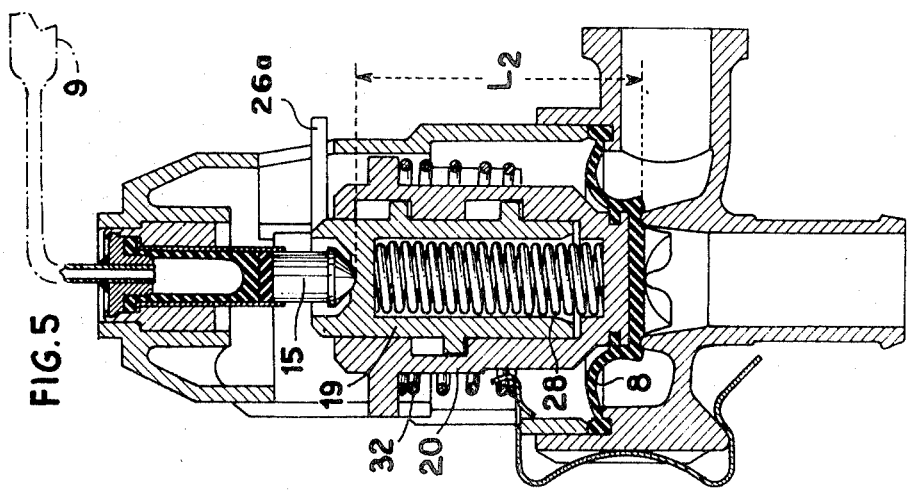

THERMOSTATIC TAP

The present invention relates to thermostatic taps for the automatic regulation of the temperature of enclosures or premises, for example the interior of automobile vehicles, and more particularly to taps of the type which comprise an automatically operating thermostatic device and a manually controlled correcting or regulating device.

Thermostatic taps of this known type are usually complicated in construction and more or less fragile, for example when the receiving element of the thermostatic device is movable in its assembly, since the tube which connects the element to the fixed bulb must move with this element. Further, these known taps are unreliable in operation, liable to breakdown and unprecise as concerns their regulation.

The object of the invention is to provide a thermostatic tap of the aforementioned type improved so as to avoid these drawbacks.

The invention provides a thermostatic tap wherein the end of the receiving element of the thermostatic device, connected to the bulb by the capillary connecting tube, has a position which is fixed relative to the body of the tap and to said bulb, the manually controlled correcting device coaxial with said receiving part is interposed between said part and the valve seat and carries the valve which modifies the passage section of the heating fluid in the body of the tap.

With this arrangement, the capillary tube has both ends fixed and this ensures the greatest reliability as to the performance or behavior of the tube.

Further features and advantages of the invention will be apparent from the ensuing description with reference to the accompanying drawings.

In the drawings:

FIGS. 3, 4 and 5 are views, similar to FIG. 1, of the movable equipment of the tap in other positions.

Figure 1:
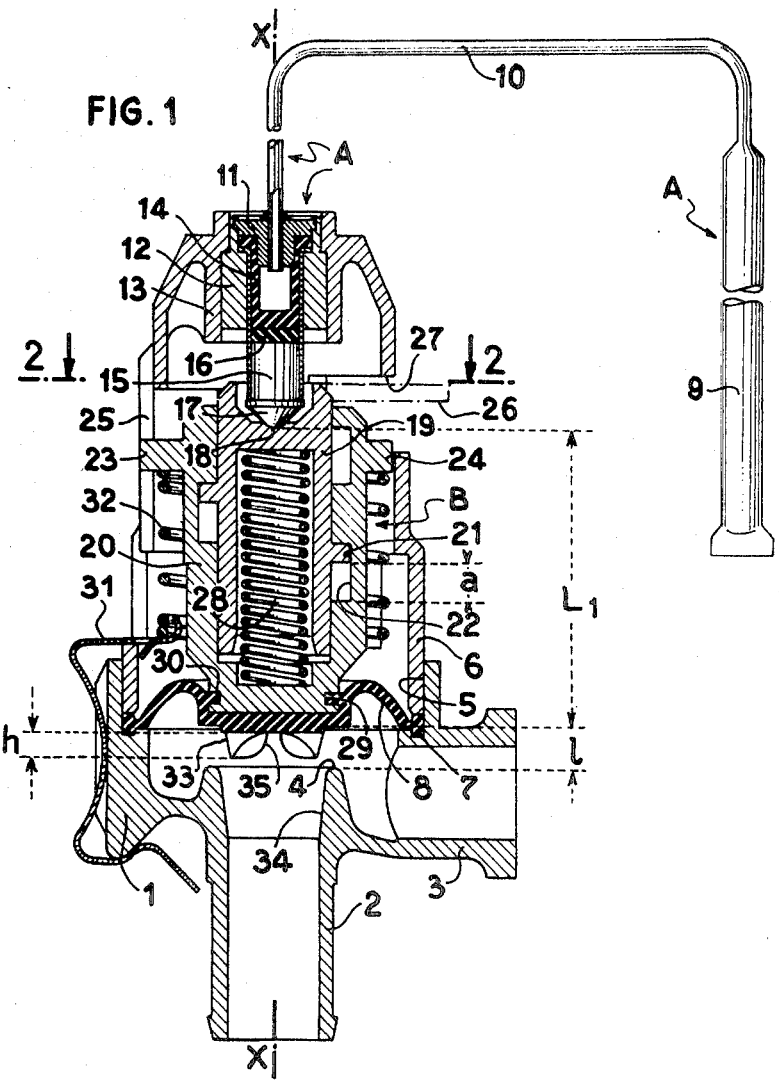
FIG. 1 is a longitudinal sectional view of a tap according to the invention in an extreme position of regulation which allows the thermostatic device its maximum effective travel.

In the illustrated embodiment, the tap comprises a tap body 1 with an axial inlet pipe 2 and a lateral outlet pipe 3. A valve seat 4 is perpendicular to the axis X—X of the tap at the end of an inner circular flange which terminates the inlet pipe 2.

The body 1 is open axially at the end opposed to the inlet pipe in the form of a bore 5 adapted to receive, fitted therein, a bell 6 clamped on a peripheral bead 7 which constitutes a sealing element of a member 8 of rubber or like material constituting a flexible membrane and valve element.

The bell 6 contains, axially, the receiving part of a thermostatic device A and a manual correcting or regulating device B interposed between the receiving part and the valve element 8 which is carried by the device B.

The thermostatic device A is of known type. It comprises mainly a bulb 9 closed at one end, the other end being connected by way of a capillary tube 10 to the receiving structure of this device. The tube 10 is connected to a plug 11 provided with an aperture and crimped onto a tubular member 12 which is fitted in a skirt portion 13 of the bell 6. The plug 11 clamps on a shoulder of the member 12 the flange of an elastically yieldable member 14 in the form of a glove finger which is the receiving element of the thermostatic device A and is shown in its inner position in FIG. 1. The bulb 9, the capillary tube 10 and the member 14 are filled with an expansible fluid. A piston plunger 15 slidable in the member 12 receives through an elastically yieldable pad 16 the thrust exerted by the glove finger 14 which is deformed by the expansion of the liquid. This piston plunger 15 terminates, at the end opposed to the end bearing against the pad, in the form of a part-spherical dome 17 which bears against a complementary face 18 on the manual correcting device B.

The device B, centered on the axis X—X in the same way as the receiving part of the device A, constitutes a movable equipment which mainly comprises an axial piston screw 19 and a nut 20 in which this screw is screw-threadedly engaged.

The screw 19, whose head comprises the face 18 which receives the thrust from the piston plunger 15, is movable in the nut 20 either helically in rotating about the axis X—X or in axial translation owing to the provision of an axial clearance $a$ between the helical thread or projection 21 of the screw 19 and the helical groove 22 defining a helical ramp of the nut 20, owing to the fact that the helical thread whose development is of the order of one turn, has a square section whereas the section of the groove 22 of the nut is rectangular and has its larger side extending longitudinally.

The nut 20 is slidably keyed in the bell 6 owing to the provision of radial lugs 23 which are carried by a flange 24 of this nut and slidable in longitudinal slots 25 in the bell.

Figure 2:
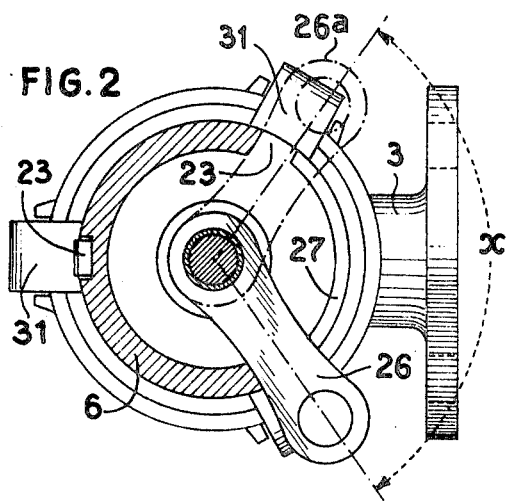
FIG. 2 is a sectional view taken along line 2—2 of FIG. 1.

As concerns the piston screw 19, it can be rotated relative to the nut by means of a radial operating lever 26 which is fixed to the screw and movable through an angle $x$ (FIG. 2) in an opening 27 in the bell between the position shown in full line in FIG. 2 and the position 26a shown in dot-dash line in the same Figure.

A resiliently yieldable means or spring 28, disposed in a blind aperture in the piston screw 19 and abutting this screw and against a solid end of the nut 20 which is also blind, tends to move the screw and nut axially away from each other. For each angular position of the screw in the nut, the maximum elongation is limited by the mutual contact between the upper faces (FIG. 1) of the thread 21 and the groove 22.

The blind end of the nut terminates in a frustoconical outer face followed by a recess 29 in which is engaged a rib of the deformable valve element 8. This arrangement both permits an easy assembly of the valve and avoids the danger of deterioration which could occur to this valve in its movements with the nut 20 relative to the seat 4.

As will be understood, the length of the device B between the dome 17 for supporting the piston plunger 15 and the lower face of the valve element 8, can be modified by a relative rotation between the piston screw 19 and the nut 20. This length can be changed from a minimum value $L_1$ shown in FIG. 1 to a maximum value $L_2$ shown in FIG. 4, the difference $L_2-L_1$ being equal to at least the maximum possible rise 1 of the valve (FIG. 1) for the value $L_1$ of the aforementioned length and when the thermostatic device is retracted to the maximum extent, so that if the thermostatic device does not operate, it is possible to close the tap by means of the lever 26. In deed, the control of the variation in the length L between $L_1$ and $L_2$ is effected by the application of a force on the end of this lever 26. As the nut 20 is locked in rotation, the piston screw 19 screws or unscrews in the nut. The lever can be controlled directly or remotely.

The bell 6, which is engaged in the bore 5 of the body 1 of the tap, is maintained in position so as to compress between this body and the bell the elastically yieldable bead on the periphery of the deformable valve element 8 whereby to seal the assembly by means of clips 31 which perform the following functions:

render the mounting of the valve element 8 in the body 1 of the tap fluidtight;

resist the forces set up by the manual or thermostatic actions which tend to separate the closing bell 6 from the tap body 1;

center the nut 20 on the seat 4 of the tap;

act as a support for resiliently yieldable means or a spring 32 which tends to separate the assembly of the manually controlled device B, that is, the valve element 8, from the seat 4.

It will be observed that the force of this spring 32 is substantially less than that of the spring 28.

As concerns the deformable valve element 8, it possesses a feature: its bearing face on the seat 4 is plane but the corresponding face has a center frustoconical skirt portion 33 which is preferably integral therewith and has a shape complementary to that of the upstream frustoconical passage 34 of the tap body 1 to within a given clearance. This skirt portion 33 has a number of recesses 35 (four are shown in the drawing) whose section decreases towards the large base of the truncated cone, that is, towards the bottom of the recesses.

The height $h$ of the skirt portion 33, the sections of the recesses 35, the law of their variation, the number of recesses and the clearance between the skirt portion 33 and the inlet 34, constitute parameters that permit modifying the law of variation of the fluid flow as a function of the temperature, ascertained by the capillary tube for the purpose of avoiding pumping of the regulation system.

The device operates in the following manner:

In FIG. 1, the assembly is in such position that the bulb 9 is at a temperature equal to or less than, that at which the piston plunger 15 starts to move. The correcting device B has been brought by action on the lever 21 to its position in which the height L has its minimum value $L_1$, this lever being in the position shown in full line in FIG. 2.

The whole of the correcting device B and the receiving part of the thermostatic device A are urged in the direction opposed to the seat 4 of the tap by the spring 32 which bears, at one end, against the clips 31 and at the other end under the upper flange of the nut 20.

The tap is fully open and the hot water can circulate at full flow through the body 1 of the tap to the heating apparatus. The bulb 9 placed in the heated enclosure transmits the heat received to the fluid which it contains. The latter, in expanding, exerts pressure on and deforms the glove finger 14 which in turn exerts a pressure on the piston plunger 15 through the elastically yieldable pad 16 (see FIG. 3).

The movement in translation of the piston plunger 15 is transmitted to the piston screw 19 which exerts a force on the nut 20 through the spring 28. The flange of the nut 20 compresses the spring 32 at a force less than that of the spring 28 and the valve element 8, in deforming, moves towards the seat 4 and reduces the passage section of the heating fluid until it closes the passage (FIG. 3), if the temperature of the bulb is too high.

If the temperature of the bulb once more drops, the movement in the opposite direction occurs and the passage section is regulated by succession of openings and closings.

Oscillations about the position of equilibrium can be reduced in providing a ratio between the height of the rise of the valve element 8 and the flow of heating water which is as constant as possible by the choice of the shapes and reciprocal dimensions of the skirt portion 33 of the valve 8 and of the tap body 1.

In the position shown in FIG. 4, the bulb 9 starts to heat and the expansible fluid has started a slight movement of the piston plunger 15 away from its inner position. The manual correcting device B has been regulated in such manner that its length is brought to its maximum value $L_2$ by an action on the operating lever 26 which has been brought to its other extreme position $26^a$ (FIGS. 2 and 4).

In this case, the valve element 8 is already on its seat 4 and the small movement of the piston plunger 15 is absorbed by the spring 28 which is compressed to the same extent and the upper faces of the rectangular-section groove of the nut 20 and of the square-section thread of the piston screw 19 are no longer in contact.

In FIG. 5, the bulb 9 is assumed to be at the maximum temperature for which it was designed. The piston plunger 15 has been urged downwardly to the maximum extent to its outer position by the expansible fluid.

The lever of the correcting device B is in position $21^a$ (FIG. 2) so that if this device were free its length would have the maximum value $L_2$ shown in FIG. 4, thus even if the bulb 9 were very cold the valve element 8 would be in the closing position. When the bulb 9 is heated, it is therefore necessary that the manual correcting device B absorb the movement created by the piston plunger 15. This is the axial clearance $a$ between the helical rectangular-section groove of the nut 20 and the square-section of the piston screw 19 which absorbs this movement by compressing the spring 28.

It is easy to understand that the device described limits the forces exerted on the component parts of the tap and, in particular, the pressure of operation of the expansible fluid contained in the bulb 9 and the pressure exerted by the valve element 8 on its seat 4 are thus limited to values determined by construction.

This assembly of means permits constructing the apparatus with materials having low mechanical performances and of cheap price while ensuring long apparatus life.

Although a specific embodiment of the invention has been described, many modifications and changes may be made therein without departing from the scope of the invention as defined in the appended claims.

Having now described my invention what I claim as new and desire to secure by Letters Patent is:

1. A thermostatic tap comprising a body structure, a valve including a valve seat fixed in position relative to said body structure and a valve element cooperable with said seat and moveable between a first position and a second position, one of said positions corresponding to a closed valve and the other position corresponding to an open valve, an automatically operative thermostatic device having a bulb, means responsive to fluid pressure changes, a tube connecting said bulb to said responsive means and an expansible fluid in said bulb, tube and responsive means, said responsive means being fixed in position relative to said body structure and including a receiving element capable of travelling in response to changes in said fluid pressure between an inner position normally corresponding to said first position of said valve element and an outer position normally corresponding to said second position of said valve element, said receiving element and said valve element being spaced a given distance apart, first resiliently yieldable means biasing said valve element toward said first position in opposition to the pressure of said fluid acting through said receiving element, and a manually controllable regulating device interposed between said receiving element and said valve element and adapted and arranged to adjust said distance between a minimum value and a maximum value, adjustment to said maximum value of said distance putting said valve element in said second position and simultaneously rendering said regulating device capable of putting said receiving element in said inner position in a nonexpanded state of said fluid, said regulating device comprising a first member and a second member coaxial with and rotatably engaged with said first member, means connecting said first member to said receiving element so that movement of said receiving element toward said outer position shifts said first member with respect to said body structure, means axially fixing said second member to 4 valve element and means preventing rotation of one of said members with respect to said body structure and means for rotating the other of said members with respect to said one member from outside said body structure, a helical ramp integral with one of said members and a projection integral with the other of said members and engaging so as to be capable of travelling along said helical ramp whereby relative rotation between said members produces relative axial movement between said members, said members being axially relatively movable irrespective of any relative rotation between said members a distance equal to at least a distance said receiving element travels through in moving from said inner position to said outer position, second resiliently yieldable means interposed between said first member and said second member and biasing said members axially away from each other but enabling said given distance to be resiliently reduced from said maximum value to said minimum value upon application of a force which is greater than a second force which is capable of causing said first yieldable means to yield but less than a force that said receiving element is capable of exerting in operation of said thermostatic device, whereby said receiving element is capable of moving to said outer position irrespective of the position of said valve element.

2. A tap as claimed in claim 1, wherein said receiving element is in the form of a glove finger and fixed to the end of a member attached to the body structure of the tap, said receiving element bearing against said first member through a piston plunger.

3. A thermostatic tap comprising a body structure, a valve including a valve seat fixed in position relative to said body structure and a valve element cooperable with said seat and movable between a first position and a second position, one of said positions corresponding to a closed valve and the other position corresponding to an open valve, an automatically operative thermostatic device having a bulb, means responsive to fluid pressure changes, a tube connecting said bulb to said responsive means and an expansible fluid in said bulb, tube and responsive means, said responsive means being fixed in position relative to said body structure and including a receiving structure capable of travelling in response to changes in said fluid pressure between an inner position normally corresponding to said first position of said valve element and an outer position normally corresponding to said second position of said valve element, said receiving structure and said valve element being spaced a given distance apart, first resiliently yieldable means biasing said valve element toward said first position in opposition to the pressure of said fluid acting through said receiving structure, and a manually controllable regulating device interposed between said receiving structure and said valve element and adapted and arranged to adjust said distance between a minimum value and a maximum value, adjustment to said maximum value of said distance putting said valve element in said second position and simultaneously rendering said regulating device capable of putting said receiving structure in said inner position in a nonexpanded state of said fluid, said regulating device including second resiliently yieldable means enabling said distance to be resiliently reduced from said maximum value to said minimum value upon application of a force which is greater than a second force which is capable of causing said first yieldable means to yield but less than a force that said receiving structure is capable of exerting in operation of said thermostatic device, whereby said receiving structure is capable of moving to said outer position irrespective of the position of said valve element, said regulating device comprising an assembly movable relative to said body structure and including in combination a rotatable piston screw which is connected to control means for rotating said piston screw and bears against said receiving structure, a nut axially slidably keyed in said body structure and carrying said valve element at an end thereof remote from said receiving structure, said piston screw having a screw thread screw-threadedly engaged with an internal screw thread in said nut, an axial clearance being provided between said screw threads, the screw thread of said piston screw having a square section of given width axially of said screw and the screw thread of said nut having helical faces defining a helical groove having a width axially of said nut which exceeds said width of said screw thread of said screw to an extent corresponding to the travel of said receiving structure between said inner and outer positions, said second resiliently yieldable means comprising an axially expansible spring which exerts greater force than said first resiliently yieldable means and tends to give to the assembly consisting of said piston screw and said nut a maximum length for each angular position of said screw relative to said nut by abutment of said thread of said screw against a helical face of said helical groove of said nut.

4. A tap as claimed in claim 3, wherein said body structure comprises a first member carrying said valve seat and a second member in which said nut is axially slidable, said valve element being a diaphragm which is engaged on an end of said nut and comprises a peripheral bead clamped between said first member and said second member.

5. A tap as claimed in claim 4, wherein said valve seat is annular and defines an inlet passageway for fluid controlled by said tap and said diaphragm comprises, in the center of a face adapted to bear against said seat, a frustoconical projecting portion having such dimensions that it is capable of penetrating said inlet passageway with clearance, said projecting portion having radial grooves adapted to allow a passage of said fluid therethrough when opening said valve.

6. A tap as claimed in claim 5, wherein said radial grooves have a cross section which narrows toward said face of said diaphragm.

7. A tap as claimed in claim 3, wherein said body structure comprises a member carrying said valve seat and a bell fitted in a bore of said member and maintained in position by elastically yieldable clips, said nut being axially slidable in said bell.

8. A tap as claimed in claim 7, wherein said clips penetrate said bell through longitudinal recesses in which are slidable radial tabs on said nut for keying said nut relative to said bell, said first resiliently yieldable means comprising a spring having one end bearing against said clips and another end bearing against said nut.